Patented May 30, 1939

2,160,168

UNITED STATES PATENT OFFICE 2,160,168

PROCESS AND MEDIA FOR THE PRESERVATION OF GREEN FODDER

Gustav Pfeiffer, Bonn-on-the-Rhine, Germany, assignor to Winthrop Chemical Company, Inc., New York, N. Y., a corporation of New York No Drawing. Original application October 22, 1938, Serial No. 236,581. Divided and this application February 17, 1939, Serial No. 256,861. In Germany September 20, 1937

7 Claims. (Cl. 99—8)

The present invention relates to a process and to media for the preservation of green fodder.

For the preservation of green fodder it is known to use acids, such as hydrochloric acid, sulfuric acid or formic acid, acid anhydrides, such as sulfur trioxide, acid chlorides, such as phosphorous pentachloride or sugar. By the addition of these substances to the green fodder the pH-value which is essential for lactic acid fermentation is raised in the fodder and fermentations which cause the degradation of proteins are prevented. The use of acidic substances may cause accidents by improper manipulation. Hence there is a technical want for a medium for preserving green fodder which may be easily handled. Urea which has already been suggested for the ensilage of green fodder is not well suited for this purpose. With sugar better results have been obtained, but during the fermentation the sugar is lost as nutrient.

I have now found that the aforesaid inconvenience may be avoided by storing green fodder in the presence of a watersoluble nitrite and a substance selected from the group consisting of non-toxic formates and acid amides.

Suitable watersoluble nitrites are for instance sodium nitrite, ammonium nitrite or potassium nitrite. Also organic nitrites, such as urea nitrite may be used.

As acid amides there come for instance into consideration formamide, acetamide, chloroacetamide, propionic acid amide, benzoic acid amide or as amide of an inorganic acid urea.

Suitable formates which can be used in the process according to the invention are by way of example: sodium formate, potassium formate, calcium formate or ammonium formate.

If desired also several acid amides, nitrites or formates may be used in my process.

The watersoluble nitrite and the formate respectively the acid amide are added to the green fodder to be preserved in the usual manner. Either the solution of the components may be sprayed upon layers of the green fodder or the solid components may be strewn in. It has proved particularly advantageous to prepare first mixtures of the watersoluble nitrite and the non-toxic formate respectively acid amide in the solid state.

The quantity of the components to be added to the green fodder depends on the nature of the fodder to be preserved and may, therefore, vary within rather wide limits. In general rather small amounts of the additional substances are sufficient in order to obtain a fodder of good quality. In general I prefer adding about 0.02 to about 0.05 per cent, advantageously 0.02–0.04 per cent of the watersoluble nitrite, about 0.1 to about 0.3 per cent, advantageously 0.1–0.25 per cent of the formate, and 0.1–0.3 per cent of the acid amide, calculated upon the quantity of the fresh green fodder to be preserved.

As non-toxic I understand a substance which in the amounts to be added to the green fodder does not exert a toxic or irritating action on cattle which eats a normal quantity thereof.

The following examples illustrate the invention without, however, restricting it thereto, the parts being by weight:—

*Example 1*

200 parts of formamide and 30–40 parts of sodium nitrite are dissolved in 5000 parts of water and added to 100,000 parts of green fodder in a finely distributed form. After four months the analysis of the green fodder thus preserved showed that it was absolutely free from butyric acid. The loss of albumen amounted to 4.5%, the pH was equal to 5.0, the fodder had an aromatic odor and retained its original structure. Acid fermentations had scarcely occurred.

*Example 2*

180 parts of formamide, 20 parts of urea and 35 parts of potassium nitrite are added to 100,000 parts of green fodder as described in Example 1. The analysis of the fodder showed about the same values as indicated in Example 1. In both cases the fodder was well liked by animals. No nitrite could be found by analysis of the fodder preserved in this manner.

*Example 3*

150 parts of calcium formate and 30 parts of sodium nitrite are intimately mixed and scattered into 100,000 parts of green fodder in a finely distributed form during ensilage. An analysis after a three months' silage showed the fodder to be absolutely free from butyric acid and to have undergone only slight fermentation. A green fodder obtained in this manner was well liked by animals even without additional fodder.

*Example 4*

130 parts of sodium formate and 20 parts of sodium nitrite are added to 100,000 parts of green fodder in the same manner as described in Example 1. An analysis of the fodder after silage showed the same satisfactory values as indicated in Example 3.

While I have described my improvements in great detail and with respect to preferred embodiments thereof, I do not desire to limit myself to such details or embodiments, since many modifications and changes may be made and the invention embodied in widely different forms without departing from the spirit or scope of the invention in its broadest aspects. Hence I desire to cover all modifications and forms within the scope or language of any one or more of the appended claims.

This application is a divisional application of my copending application Serial No. 236,581, filed October 22, 1938.

I claim:

1. The process for preserving green fodder which comprises storing the fodder in the presence of a watersoluble nitrite and a non-toxic acid amide.

2. The process for preserving green fodder which comprises storing the fodder with about 0.02 to about 0.04 per cent of a watersoluble nitrite and about 0.1 to about 0.3 per cent of a non-toxic acid amide.

3. The process for preserving green fodder which comprises storing the fodder in the presence of a watersoluble nitrite and a non-toxic amide of an organic acid.

4. The process for preserving green fodder which comprises storing the fodder in the presence of a watersoluble alkali metal nitrite and formamide.

5. Medium for preserving green fodder comprising a watersoluble nitrite and a non-toxic acid amide in the solid state.

6. Medium for preserving green fodder comprising a watersoluble nitrite and a non-toxic amide of an organic acid in the solid state.

7. Medium for preserving green fodder comprising a watersoluble alkali metal nitrite and formamide in the solid state.

GUSTAV PFEIFFER.